G. P. BAUER.
TRACTION MAT.
APPLICATION FILED DEC. 27, 1920.
1,375,666.
Patented Apr. 26, 1921.
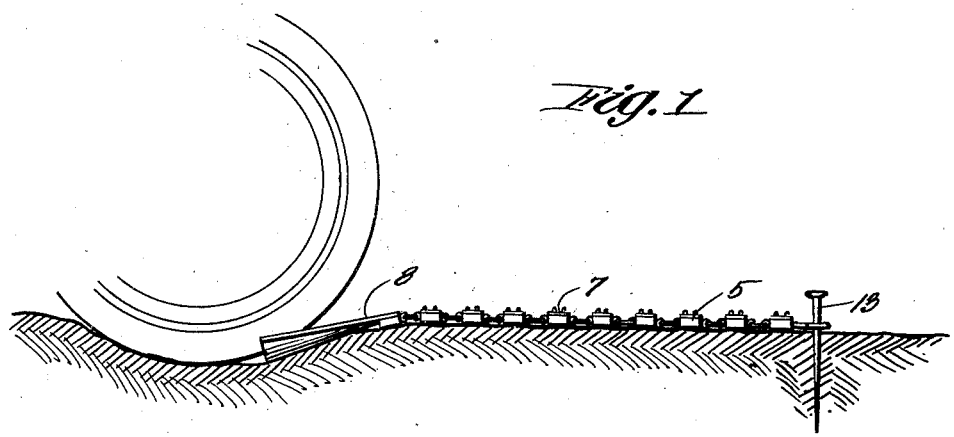
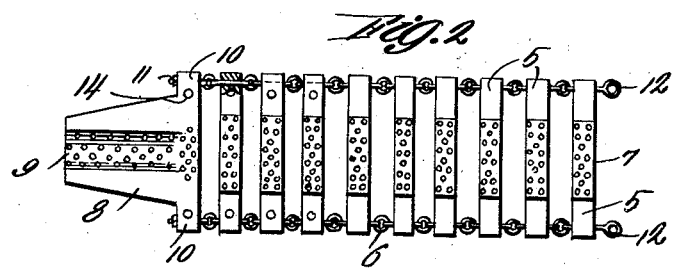
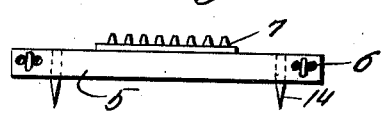
Inventor
GEORGE P. BAUER
Witnesses
By Richard B. Owen
Attorney

UNITED STATES PATENT OFFICE.

GEORGE P. BAUER, OF MIAMI, ARIZONA.

TRACTION-MAT.

1,375,666.  Specification of Letters Patent.  Patented Apr. 26, 1921.

Application filed December 27, 1920. Serial No. 433,404.

*To all whom it may concern:*

Be it known that I, GEORGE P. BAUER, a citizen of the United States, residing at Miami, in the county of Gila and State of Arizona, have invented certain new and useful Improvements in Traction-Mats, of which the following is a specification.

This invention relates to traction mats, the principal object of which is to provide suitable means to facilitate a vehicle, especially a motor vehicle, to extricate itself from a mud-hole or the like.

Another object is to provide a device of simple construction which may be conveniently carried in a tool box, and which is capable of application to the road of travel almost immaterial of the condition of the latter.

A further object of the invention is to provide an inexpensive device of this character which will be positive in its operation and which is of such a construction that it will be unnecessary to hoist the wheel or to in any way alter the position of the vehicle in order to obtain proper use of the mat.

Still further objects of the invention will be apparent from the following description taken in connection with the accompanying drawings, wherein:

Figure 1, is a side elevational view of a device constructed in accordance with this invention illustrating its application.

Fig. 2, is a top plan view of the same, a portion thereof being broken away to disclose details.

Fig. 3, is a sectional view of the device taken transversely thereof, and

Fig. 4, is an end elevational view of the mat showing the end initially approached by the vehicle wheel.

The device of this invention consists especially of a plurality of traction blocks 5, which in this instance are shown to be of an oblong configuration, although it is to be understood that these may be of any other desired shape. The blocks are connected by flexible means 6, which may constitute eye-bolts interengaged as shown in Figs. 2 and 3. Any number of traction blocks may be used and if desired any or all of them may be equipped with studded traction plates 7. It is preferred however that these plates be engaged at least with the traction blocks comprising the end of the mat over which the vehicle wheel will first travel to provide a gripping surface. The plates 7 may be secured to the blocks 5 in any desired manner and the studs which are formed thereon may be of any desired shape.

One end of said series of said traction blocks 5 is in engagement with a traction lift 8, the latter being preferably of a truncated cone shape in top plan and provided with a longitudinally extending recess 9, which tapers toward the outer end thereof as shown to advantage in Fig 1. This recess is studded and is of a width to conveniently accommodate standard size vehicle tires. One end of the block is provided with lateral extensions 10, through which bolts extend, one end of each bolt being formed to provide an eye which connects with the eye-bolt of the adjacent traction block, the opposite end being threaded and engaged by a nut 11, thereby permitting disengagement of the lift 8.

The opposite end of said series of blocks 5, to that which carries the lift 8, has eyes 12 extended therefrom which are adapted for the reception of anchoring pins or bolts 13, which latter are driven into the road of travel as advantageously illustrated in Fig. 1.

In use of this device, the lift 8 is preferably inserted beneath the tire of the driving wheel as illustrated to advantage in Fig. 1. Consequently, as soon as motion is imparted to said wheel, the periphery of the latter will grip the studs formed in the recess 9 of said lift. Since the mat is anchored in the road of travel by the pins 13, it will be apparent that the said wheel will ride up over said lift 8 and onto the traction plates 7 in an obvious manner. When the device is not in use it may be folded into a comparatively small space and conveniently carried in the tool box of the vehicle.

Various changes may be made in this device, especially in the details of construction, proportion and arrangement of parts, without departing from the spirit and scope of the invention. For instance, if desired, anti-slipping pegs 14 may be mounted in the extended portion 10 of the lift 8 and any one or all of the blocks 5. In this way lateral as well as longitudinal displacement of the mat will be prevented.

What is claimed is:

1. A traction mat including a rigid lift having a tapering studded recess formed in its longitudinal center.

2. A traction mat including a series of flexibly connected blocks, one end of which is adapted to be anchored, and a traction lift flexibly connected with the opposite end of said series of blocks and engageable beneath the driving wheel of a vehicle to grip the latter upon revoluble movement thereof.

In testimony whereof I affix my signature in presence of two witnesses.

GEORGE P. BAUER.

Witnesses:
 FRED C. PIERPOINT.
 A. REED.